United States Patent [19]

Slater

[11] Patent Number: 5,243,370
[45] Date of Patent: Sep. 7, 1993

[54] CAMERA STABILIZER

[76] Inventor: Dan Slater, 1352 Dorothea Rd., La Habra Heights, Calif. 90631

[21] Appl. No.: 238,834

[22] Filed: Aug. 30, 1988

[51] Int. Cl.$^5$ .................. G03B 17/00; G03B 21/00
[52] U.S. Cl. ............................ 352/243; 354/81; 354/82; 354/293; 248/123.1
[58] Field of Search ............ 352/243; 354/81, 82, 354/293; 248/123.1

[56] References Cited

U.S. PATENT DOCUMENTS

| | | |
|---|---|---|
| 3,756,549 | 9/1973 | Lange . |
| 4,017,168 | 4/1977 | Brown . |
| 4,156,512 | 5/1979 | Brown .......................... 248/123.1 |
| 4,208,028 | 6/1980 | Brown et al. . |
| 4,394,075 | 7/1983 | Brown et al. . |
| 4,474,439 | 10/1984 | Brown ............................. 352/243 |
| 4,496,228 | 1/1985 | Schmidt . |
| 4,621,785 | 11/1986 | Embra . |
| 4,621,786 | 11/1986 | Greenlee . |
| 4,672,436 | 6/1987 | Hawthorne ...................... 354/293 |

OTHER PUBLICATIONS

Brochure of International Camera Systems "Pogocam" (date unknown).
Brochure entitled Cawa Systems New Product Release (date unknown).
Article entitled "Ancient History" published in Steadicam Letter vol. 1 No. 3 (dated Dec. 3, 1988).
Brochure entitled "Steadicam" (dated May 1976).
Steadicam Film/Video Camera Stabilizing System (date unknown).
Brochure entitled "Moto Cam Pursuit Specialist" (date unknown).
Brochure entitled "Steadicam Film/Video Camera Stabilizing System (Universal Model III)" (dated Apr. 1983).
Brochure entitled "Price List Steadicam Universal Model III" (dated Jan. 1, 1988).
"Steadicam" (dated Feb. 17, 1988).
Brochure entitled "Panaglide" (dated 1983).

*Primary Examiner*—Monroe H. Hayes
*Attorney, Agent, or Firm*—Graham & James

[57] ABSTRACT

A camera stabilizer which can be carried by the camera operator having three masses, one of which is a camera, maintained in positions separate from one another by a frame. Because the three masses are separated, the stabilizer has a high angular moment of inertia making the camera stabilizer less susceptible to unwanted movement. A handle is attached to the frame at approximately the center of gravity of the camera stabilizer and has a gripping axis parallel to the plane of a camera mount.

14 Claims, 2 Drawing Sheets

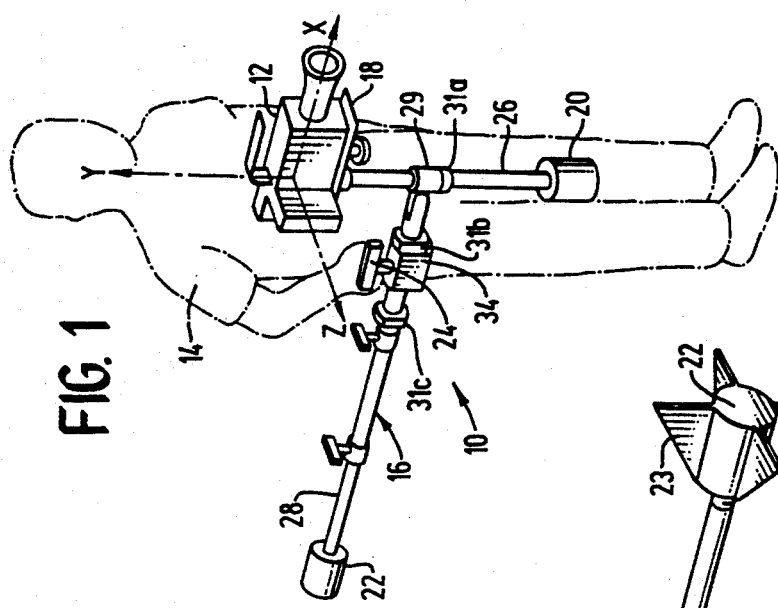
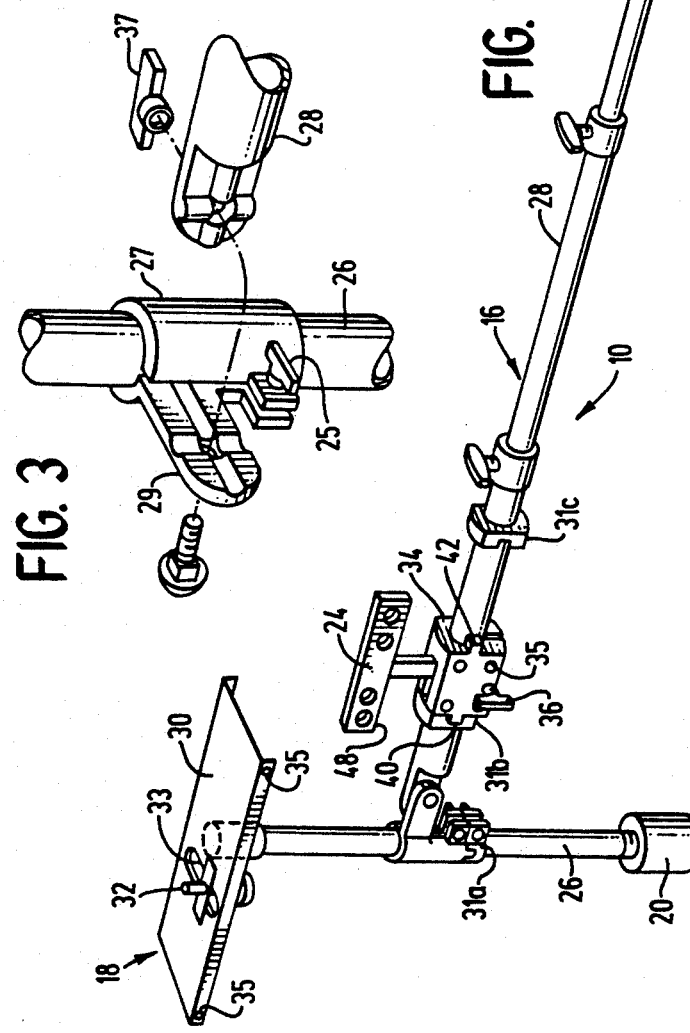

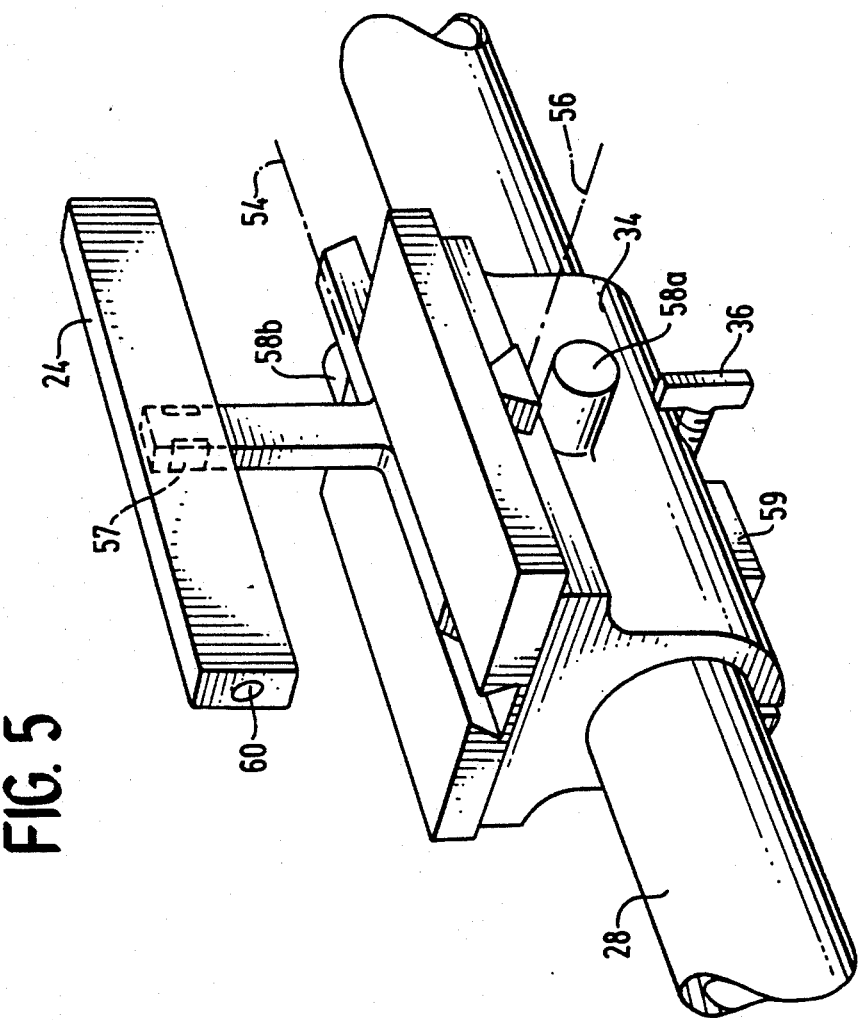

CAMERA STABILIZER

BACKGROUND OF THE INVENTION

1. Field of the Invention

This invention relates to camera stabilizers, and more particularly to hand held camera stabilizers which allow the camera and operator to move while filming or taping events.

2. Description of Related Art

Advances in optical, video, and traditional photographic technologies have made high quality portable photographic equipment available to a growing number of film enthusiasts. As a result, photographers are continually creating motion pictures of increased quality and complexity. However, a problem encountered by nearly all film enthusiasts is that of shooting smooth, quality footage with a hand held camera. This problem, which is encountered when the operator tries to hold the camera steady, rotate the camera through an angle (i.e, panning), or move the camera in translation, is caused in part because of operator motion which is transmitted to the camera resulting in unwanted camera motion.

The problem of unwanted camera motion during hand held filming is especially noticeable when filming conditions require panning, moving the camera, or where either the camera or the camera operator is required to move. Turning or carrying the camera in a smooth even fashion requires a great deal of skill and experience, particularly in action scenes where the camera operator is walking, running, or riding in a vehicle to follow the subject of the film. In action situations, the already difficult task of holding a camera steady despite motions resulting from the operator's breathing, heart beat, and involuntary muscle movements, is severely aggravated by environmental conditions. As a result, footage is frequently erratic, jerky, difficult to watch and visually unappealing. Although sudden translational disturbances and unsteady camera movements contribute to this problem, angular disturbances, particularly high frequency angular disturbances, are most prevalent and are also most difficult to control.

Film makers have eliminated unwanted camera movements in most contexts by using complex camera hoists, booms and damping equipment which is not operator-held. When operator-held filming is necessary, many film makers rely on systems similar to that described in U.S. Pat. No. 4,158,488. In this system, the camera is mounted on a gimbal device attached to an articulated arm. The arm is connected to a body harness which is worn by the camera operator. Shock isolation systems in the arm and gimbal device minimize unwanted camera movement. Additionally, the system, including the camera and its associated equipment, is a relatively high mass body with relatively high angular and translational moments of inertia which help to eliminate undesirable camera movement. The harness lowers operator fatigue by transferring the bulk of the weight of the system to the operator's body. However, while the system works well, it is prohibitively expensive and complex for most amateur photographers.

U.S Pat. No. 4,206,983 also describes a body-mounted camera stabilizer. The stabilizer relies on a complex system of articulated arms and damping devices to minimize unwanted camera movement. However, it is also excessively complex and expensive for most amateur photographers.

Several camera stabilizers have been designed for amateur photographers. Such systems typically include camera carrying frames of various configurations. Some also include weights in the frame in an attempt to increase the angular moment of inertia of the camera system. However, each presently available system has several shortcomings. For example, in some systems, such as that described in U.S. Pat. No. 2,945,428, the frame encircles the body or head. Such a system is inherently dangerous, particularly in action situations where the device is most needed. U.S. Pat. No. 4,672,436 discloses a support made of a single staff and a camera supported with its lens coaxial with the holding axis. It provides yaw and pitch stability but essentially no roll stability. Roll stability is accomplished by gripping the unit with two hands at separated locations. This aggravates the problem of angular disturbances because disturbances are transmitted to the stabilizer from a point other than the center of gravity, dramatically increasing the torque and the amount of angular disturbance. Other systems, such as that of U.S. Pat. No. 2,806,416, are frequently designed to be held at shoulder height or in front of the operator. Maintaining the camera system in these positions requires the operator to hold the device with flexed muscles. As a result, the operator's muscles fatigue rapidly and contribute to camera instability.

SUMMARY OF THE INVENTION

It is an object of the invention to provide an improved camera stabilizer that effectively reduces unwanted camera movement in all directions.

A further object of the invention is to provide an improved camera stabilizer that is relatively inexpensive to manufacture and simple to use and compact to store in a wide variety of filming and other environments.

In accordance with these and other objects, a preferred embodiment of the present invention comprises a rigid frame to which three peripheral masses, one of which is a camera, are connected. The masses are maintained in relatively widely separated positions by the frame. As a result, the camera stabilizer has a relatively high angular moment of inertia in all directions. The stabilizer has a handle which is located at the center of gravity of the entire system. The stabilizer has a handle having an axis parallel to the plane of a camera mount. This configuration enables the space above the handle to be unobstructed and facilitates a horizontal gripping orientation.

Other objects and aspects of the invention will become apparent to those skilled in the art from the detailed description of the invention which is presented by way of example and not as a limitation of the present invention.

BRIEF DESCRIPTION OF THE DRAWINGS

FIG. 1 is an elevated perspective view of a camera stabilizer in accordance with a preferred embodiment of the invention with an attached camera and being held by an operator.

FIG. 2 is an elevated perspective view of the stabilizer of FIG. 1.

FIG. 3 is a cut-away partially exploded view of a portion of the stabilizer shown in FIG. 2.

FIG. 4 is a side view of the camera stabilizer of FIG. 1 shown in a monopod configuration.

FIG. 5 is an elevated perspective view of an automatically adjusting handle which can be used with the camera stabilizer.

DESCRIPTION OF THE PREFERRED EMBODIMENT

A camera stabilizer in accordance with a preferred embodiment of the present invention is indicated in the drawings generally at 10. In FIG. 1, a stabilizer is shown being held in operating position by an operator 14 and with an attached camera 12. The camera stabilizer includes a rigid frame 16. A camera mount 18, a first mass 20, and a second mass 22, are attached to the frame 16. The stabilizer 10 has a handle 24 which can be gripped by the operator 14 to hold the stabilizer 10. The handle 24 is located at an area including the center of gravity of the stabilizer/camera system.

In the embodiment shown in FIG. 2, the frame 16 is made of a vertical strut 26 and a horizontal strut 28 joined to form a horizontal "T" configuration. The struts 26 and 28 can be made of any strong rigid material, such as aluminum or titanium. Although the length of the struts is widely variable depending on the amount of stability required, the size of the operator, and the filming environment, lengths of about 30 inches for the vertical strut 26 and about 48 inches for the horizontal strut 28 have been found to be satisfactory. For ease of storage, the horizontal strut 28 can be telescopic.

As shown in FIG. 3, the horizontal strut 28 can be joined to the vertical strut 26 with a hinge 29 to allow the horizontal strut 28 to swing into a position parallel to the vertical strut 26 as shown in FIG. 4. In this configuration, with the horizontal strut 28 extended, the stabilizer 10 can serve as a monopod or, if strut 28 is collapsed, the stabilizer 10 becomes a compact unit for storage and transport. The hinge is capable of locking the horizontal strut 28 in either the horizontal or vertical positions by turning knob 36. The hinge 29 can be attached to the vertical strut 26 so as to allow it to slide up and down along the vertical strut 26. In the illustrated embodiment, this is accomplished by attaching the horizontal strut 28 to a split sleeve 27 which encircles the vertical strut 26. The split sleeve 27 can be loosened to allow movement of the horizontal strut 28 or tightened to lock the horizontal strut in position by turning knob 25. In this manner, the hinge can be slid to a position adjacent the camera mount for storage. Additionally, an indexing ring 31 can be used to reproducibly position the hinge at a desired location along the vertical strut 26.

The camera mount 18 is located at the top of the vertical strut 26. It is provided with a flat upper surface 30 to receive and support the base of the camera 12 (shown in FIG. 1). A mounting screw 32 extends through a slot 33 in the camera mount 18 to fix the camera 12 to the camera mount 18. The camera typically is mounted to face forward, i.e., so that the axis of its lens is parallel to the strut 28, but can be rotated and/or pivoted for special applications. The slot 33 extends sideways across the camera mount 18 to allow the camera 12 to be moved laterally. In some situations it may be desirable to use accessories, such as a video view finder, in conjunction with the camera stabilizer. These accessories can be attached to the camera mount (or to other portions of the stabilizer) by means of a number of threaded holes 35 provided at convenient locations.

A first mass 20 is attached at the bottom of the vertical strut 26. In the embodiment illustrated, the first mass 20 is manufactured of metal such as brass and is provided with a threaded hole to enable it to be threaded onto the end of the vertical strut 26.

A second mass 22 is attached to the rear end of the horizontal strut 28. Although the size and weight of the masses may vary considerably depending on operator's preferences and the filming environment, weights in the range of 1 to 5 pounds have been found to provide satisfactory stabilization while maintaining the overall weight of the unit at a reasonable amount. A weight of about 2.5 pounds for each mass is appropriate for most circumstances. In some situations it may be desirable to cover the masses with a pad and/or to color them a bright color for safety purposes. Similarly, the shape of the masses can be altered so that they are more aerodynamic and less likely to catch on objects during use. In particular, when the stabilizer is being used in a high speed situation, its stability may be increased by attaching fins 23, similar to those on an arrow, to or near the second mass 22. This moves the center of pressure behind the center of gravity and results in enhanced aerodynamic stability.

The camera 12, when attached to the stabilizer 10 via the camera mount, serves as a third mass. Because of the three masses, i.e., masses 20 and 22 and the camera 12, the camera/stabilizer assembly has a higher moment of inertia than a camera alone. Furthermore, because the three masses are maintained in widely separate positions by the relatively light frame 16, the camera/stabilizer assembly has a high moment of inertia in three degrees of motion, i.e., pitch (X-Y plane of FIG. 1), yaw (X-Z plane) and roll (Y-Z plane) with a relatively low mass. As a result of the high moments of inertia, the camera/stabilizer assembly is less susceptible to unwanted movement resulting from external forces. The high moments of inertia make it easier to maintain the camera in a fixed position, to pan smoothly, and to move the camera in a steady fashion. It will be appreciated that in order to maximize the angular moment of inertia for a given total weight the frame 16 should be as light as possible compared to the three separated masses. In addition, in order to achieve desired stability in all directions of motion, the masses and frame dimensions should be such that the various moments of inertia are similar in value (preferably within a factor of 4-5 with respect to each other). In general, it is desirable that the ratio of the largest to smallest separation distance between the three masses be no greater than about three and one half to one.

Although the horizontal strut itself can serve as a handle for the stabilizer, preferably a separate handle 24 is provided and is attached to the horizontal strut 28. Preferably, the handle 24 is of a configuration (such as a "T" or "D" type with an indexing pin) so that it accurately positions the operator's hand at the center of gravity of the stabilizer/camera assembly. A "T" type handle 24 also greatly reduces disturbances from the operator by providing a smaller cross-section which readily matches the operator's hand, minimizes coupling of disturbance torques, and takes advantage of the natural strength of the middle fingers. The lower surface 48 of the handle 24 can be flat so as to fit the operator's hand and provide a more uniform force distribution on the fingers to aid the operator in maintaining proper orientation of the stabilizer.

Many different configurations of the stabilizer may be adopted, with the general requirements being that the handle defines a holding axis which is substantially parallel to the plane of the camera mount (the X-Z plane in FIG. 1). Additionally, in the illustrated configuration the area above the handle 24 is clear of obstructions. These features assist the operator in controlling the direction of the lens. Furthermore, in most filming contexts these features allow the operator to hold the stabilizer with one hand with the stabilizer hanging from an unflexed arm. This greatly minimizes operator muscle fatigue which contributes to camera instability.

The handle 24 is attached to the horizontal strut 28 by means of a ring clamp 34, which encircles the horizontal strut 28. A knob 36 loosens the ring clamp to allow the handle to slide along the horizontal strut 28. In this manner, the position of the handle can be adjusted along the strut by loosening knob 36, positioning the handle in the desired position, and tightening knob 36 to hold the handle firmly in its place.

In order to facilitate smooth, steady movement of the camera/stabilizer assembly, the handle should be positioned so as to locate the operator's hand at the center of gravity of the combined camera/stabilizer assembly. When the operator exerts a force on the handle to move the combined stabilizer/camera device, a moment is created and the device will tend to rotate about its center of gravity. Proper location of the handle is facilitated by moving the camera 12 along the slot 33 to adjust the center of gravity along the Z axis, sliding the handle 24 along strut 28 to properly locate the handle along X axis, and sliding strut 28 up and down along strut 26 to properly locate the handle along the Y axis. As a result of the adjustable nature of the stabilizer, it is well suited for use with a wide variety of cameras and accessories.

Additionally, the illustrated embodiment is provided with indexing rings 31a, 31b and 31c which are clamped around struts 26 and 28. The indexing rings 31b and 31c allow the handle 24 to be quickly and easily be located in a predetermined position along strut 28 by sliding the handle 24 until the ring clamp 34 abuts the appropriate indexing ring. Tabs 40 and 42 are provided on the ring clamp 34 to engage with slots 44 and 46 provided in indexing rings 31b and 31c to further assist in the accurate positioning of the handle 24. Indexing ring 31a acting in a similar manner aids in the accurate positioning of strut 28 relative to strut 26.

During use, the center of gravity of the camera/stabilizer assembly may change slightly. For example, as the film or tape moves from one reel to another or as the lens moves during focusing, the shifting mass of the tape, film, or lens will cause a slight change in the center of gravity of the camera/stabilizer assembly. Additionally, in various filming environments, the operator may tend to support the camera/stabilizer assembly more with the front fingers or the rear fingers, with the result being that the assembly is not being supported at its exact center of gravity.

Therefore, where extreme accuracy is necessary, the stabilizer can be provided with a system to detect minor variations in the center of gravity with respect to the support point and compensate for them by automatically adjusting the position of the handle 24. For example, a shift in the center of gravity or gripping position will require the operator to exert a constant torque on the handle 24 to maintain the stabilizer assembly in its appropriate orientation. As illustrated in the embodiment shown in FIG. 5, a torque sensor 57, such as a strain gauge, attached to the handle 24 can sense this torque and provide a signal indicating that the handle position must be shifted so that the support point coincides with the center of gravity. Alternatively, an accelerometer or a level sensor 59, such as a mercury switch or pendulum, can be used to sense changes in orientation of the stabilizer and output a signal indicating a shift in the center of gravity. This is particularly desirable for the roll axis.

In response to either or both of these sensor signals the position of the masses or the handle (or both) can be automatically adjusted. For example, as shown in FIG. 5, the handle 24 can be movably mounted on a table 52 (movable along an axis 54) with the table in turn being movable with respect to the strut 28 along an axis 56 orthogonal to the axis 54. The output from the sensors can be used to control motors 58a and 58b which move the table and handle, respectively, by means of lead screws (not shown). In this manner, the handle position can be automatically adjusted to achieve zero torque input and maintain the stabilizer in a level orientation. An override switch 60 on the handle allows the operator to prevent automatic adjustment of the handle when filming requires a constant torque input or to prevent operation of the adjustment mechanism when the unit is set down or otherwise not in use. The motor assemblies may be provided with high gear ratios so as to provide a large time constant (i.e., to cause movement of the handle to occur relatively slowly). This serves to filter out momentary torque and acceleration disturbances.

A similar feedback system could be used to adjust the positions of the masses and/or the camera instead of the handle in order to maintain coincidence of the handle and the center of gravity of the camera/stabilizer assembly.

The stabilizer will typically be used with a single camera. However, it can also be used with more than one camera, with an additional camera replacing one of the spaced weights (for example the weight 22 so as to facilitate simultaneous forward and rear shooting). In addition, the camera mount could be located at the end of the strut 28 instead of on the strut 26 (in which case a mass would be provided at each end of the strut 26).

In some filming contexts it may also be desirable to pivotably mount the camera on the frame. With appropriate controls, this would allow the operator to pan, tilt, or roll the camera without turning the stabilizer. This motion could be either manual or electric depending on the particular requirements of the operator.

Although the invention has been described in terms of a hand held embodiment, it will be appreciated that it is also capable of being supported on the operator's shoulder by providing a shoulder pad at the center of gravity. Similarly, the stabilizer may be suspended from a wire secured to a support above the stabilizer. In each of these embodiments, the stabilizer assembly has a single point of support at the center of gravity of the stabilizer, i.e., a handle area for grasping by one hand of the operator, a shoulder support area for supporting on one shoulder of the operator, or a wire connection area for supporting the unit by means of a single wire.

This detailed description is set forth only for purposes of illustrating an example of the present invention and should not be considered to limit the scope thereof in any way. Clearly, numerous additions, substitutions and other modifications can be made to the invention without departing from the scope of the invention which is defined in the appended claims and equivalents thereof.

What is claimed is:

1. A camera stabilizer adapted for carrying in one hand, comprising:
   a frame section having a handle defining a holding axis and at least first, second and third peripheral mass support locations, wherein at least the second and third mass locations are spaced away from the holding axis and wherein the first mass location is distanced from a straight line drawn through the second and third mass locations;
   a first mass supported at the first mass location;
   a second mass supported at the second mass location; and
   a camera mount located at the third mass location, said camera mount having a mounting surface substantially parallel to the holding axis, the camera mount for supporting a camera in a location in which the entire camera is spaced apart from the holding axis, said handle being positioned to include the center of gravity of the camera stabilizer when a camera is supported by the camera mount.

2. A camera stabilizer adapted for carrying in one hand, comprising: comprising:
   a first strut;
   a camera mount, attached to a first end of said first strut and having a mounting plane, for receiving a camera;
   a first mass attached to a second end of said first strut;
   a second strut, a first end of said second strut being connected to the first strut between the camera mount and the first mass;
   a second mass attached to a second end of the second strut; and
   a handle located on the second strut and including the center of gravity of the stabilizer when a camera is mounted on the camera mount, said handle having a holding axis substantially parallel to the mounting plane of the camera mount.

3. A stabilizer as in claim 2 wherein the handle is comprised of a portion of the second strut.

4. A stabilizer as in claim 2 wherein the handle is comprised of a handle attached to the second strut and including the center of gravity of the stabilizer when a camera is mounted on the camera mount, the handle having at least one leg attached to the second strut and a top grasping portion.

5. A stabilizer as in claim 4 wherein the handle is T-shaped.

6. A stabilizer as in claim 4 wherein the top portion of the handle is substantially parallel to the second strut.

7. A stabilizer as in claim 5 wherein the top portion of the T-shaped handle has a lower surface facing the strut, wherein said lower surface is substantially flat.

8. A hand held camera stabilizer, comprising:
   a frame including a handle portion which is gripped by an operator during use of the stabilizer, said handle portion having a gripping axis;
   first and second stabilizing weights located on the frame and spaced from the handle; and
   a camera mount located on the frame for securing a camera having a lens axis thereto, the camera mount being configured such that a camera is securable with its lens axis being substantially parallel to the gripping axis;
   the camera and stabilizing weights defining three spaced masses, wherein the frame is configured such that one of the masses is located on the gripping axis and the other masses are spaced away from the gripping axis to provide moments of inertia in pitch, yaw and roll that are of substantially similar magnitude, wherein the frame has a first leg and a second leg, wherein one end of the first leg is attached to a mid-point of the second leg and the other end is free wherein the first weight is attached to the free end of the first leg, the second weight is attached to one end of the second leg and the camera mount is attached to the other end of the second leg, the camera mount securing a camera so that its lens axis is substantially parallel to the first leg, wherein the handle is located on the first leg;
   wherein the handle portion is located so as to include the center of gravity of the combined frame, weight and camera assembly.

9. A stabilizer for an optical device such as a camera comprising:
   a frame section having at least first, second and third separated peripheral mass locations and a support area located between the mass locations wherein the frame section is comprised of first and second substantially orthogonal struts, a first end of the first strut being connected to a mid-point of the second strut;
   a mounting element having a substantially planar mounting surface located at the first mass location;
   mass mounting means for supporting masses at the second and third mass locations, wherein when an optical device is secured to the mounting surface and masses are secured to the second and third mass locations, the stabilizer will have a center of gravity at the support area; and
   an elongated handle element attached to the first strut at the support area of the frame section thereby to include the center of gravity and having a grasping axis which is substantially parallel to the plane of the mounting surface.

10. A portable camera stabilizer comprising
    a plurality of masses, at least one of said masses being a camera;
    a frame maintaining said masses in separated positions to provide a high angular moment of inertia of the camera stabilizer, said frame and masses including a support point at a location near the center of gravity thereof;
    a sensor for sensing changes in the location of the center of gravity of the camera stabilizer with respect to the support point;
    adjusting means for automatically adjusting the location of at least one of the support point or the center of gravity of the stabilizer in response to the sensor output to cause the center of gravity of the camera stabilizer to coincide with the support point.

11. The stabilizer of claim 10 wherein the sensor for at least one axis is a level sensor.

12. The stabilizer of claim 10 wherein the sensor for at least one axis detects torques applied to the handle.

13. A hand holdable, single support point stabilizer for an optical device such as a camera comprising:
    a frame;

three masses attached to the frame at locations spaced from one another, at least one of said masses being a camera;

a handle attached to the frame near the center of gravity of the stabilizer;

a sensor for sensing when the handle and the center of gravity of the stabilizer do not coincide;

moving means for automatically moving the position of the handle toward the center of gravity in response to the output from the sensor.

14. A portable camera stabilizer comprising:

a plurality of masses, at least one of said masses being a camera;

a frame maintaining said masses in separated positions to provide a high angular moment of inertia of the camera stabilizer, said frame and masses including a support point at a location near the center of gravity thereof;

a sensor for sensing the orientation of the camera;

adjusting means for automatically adjusting the location of at least one of the support point or the center of gravity of the stabilizer in response to the sensor output to obtain a desired camera orientation.

* * * * *